(12) United States Patent
Jezek

(10) Patent No.: US 7,851,956 B2
(45) Date of Patent: Dec. 14, 2010

(54) ELECTRIC MOTOR WITH A LOW NUMBER OF REVOLUTIONS, IN PARTICULAR TO DRIVE LIFTING DEVICES

(75) Inventor: Giorgio Jezek, Via Ponte Alto, 45, Cognola de Trento (IT) I-38050

(73) Assignee: Giorgio Jezek, Cognola di Trento (IT)

( * ) Notice: Subject to any disclaimer, the term of this patent is extended or adjusted under 35 U.S.C. 154(b) by 254 days.

(21) Appl. No.: 12/096,937

(22) PCT Filed: Mar. 19, 2007

(86) PCT No.: PCT/IB2007/000669
§ 371 (c)(1),
(2), (4) Date: Jun. 11, 2008

(87) PCT Pub. No.: WO2007/129150
PCT Pub. Date: Nov. 15, 2007

(65) Prior Publication Data
US 2009/0001828 A1  Jan. 1, 2009

(30) Foreign Application Priority Data

Apr. 28, 2006 (IT) .......................... BZ2006A0015
May 9, 2006 (IT) .......................... BZ2006A0018
May 10, 2006 (IT) .......................... TN2006A0007

(51) Int. Cl.
H02K 7/10 (2006.01)
H02K 49/00 (2006.01)
H02K 49/02 (2006.01)
H02K 47/00 (2006.01)

(52) U.S. Cl. .......................... 310/77; 310/76; 310/104; 310/105; 310/112

(58) Field of Classification Search .......... 310/76, 310/77, 104
See application file for complete search history.

(56) References Cited

U.S. PATENT DOCUMENTS

| 1,535,774 | A |   | 4/1925 | Hibbard |
|---|---|---|---|---|
| 4,019,104 | A | * | 4/1977 | Parker ........................ 318/832 |
| 4,197,474 | A | * | 4/1980 | Honigsbaum ............... 310/104 |

(Continued)

FOREIGN PATENT DOCUMENTS

DE  3511408 A1  10/1985

(Continued)

OTHER PUBLICATIONS

MAchine Translarion GB1359351 (1971) and EP1642858 (2006).*

Primary Examiner—Quyen Leung
Assistant Examiner—Jose A Gonzalez Quinones
(74) Attorney, Agent, or Firm—Sampson & Associates, P.C.

(57) ABSTRACT

An electric motor (10) with a low number of revolutions comprises a rotor (17) powered by three-phase alternating voltage, a series of magnets (21, 22) and a coil forming a stator (24), in which the rotor (17) and the stator (24) have the same number of magnetic poles. The stator (24) is powered with direct voltage, and the frequency of the rotor voltage (17) is varied to obtain a predetermined number of rpm of the motor and to vary the acceleration and deceleration conditions of the motor. A thrust bearing opposes the effort of the falling brake disc.

11 Claims, 1 Drawing Sheet

U.S. PATENT DOCUMENTS

| | | | |
|---|---|---|---|
| 4,713,567 A * | 12/1987 | Fey et al. ..................... 310/105 |
| 6,333,577 B1 * | 12/2001 | Kusumoto et al. ...... 310/102 R |
| 2002/0171305 A1 | 11/2002 | Coupart et al. |
| 2003/0042813 A1 * | 3/2003 | Morikaku et al. ............. 310/91 |

FOREIGN PATENT DOCUMENTS

| | | | |
|---|---|---|---|
| EP | 0695662 | A | 2/1996 |
| EP | 1010660 | A1 | 6/2000 |
| EP | 1642858 | A | 4/2006 |
| EP | 1642858 | A2 * | 4/2006 |
| FR | 2807887 | A1 | 10/2001 |
| GB | 1359351 | A * | 8/1971 |
| GB | 1359351 | A | 7/1974 |
| JP | 61076040 | A | 4/1986 |

\* cited by examiner

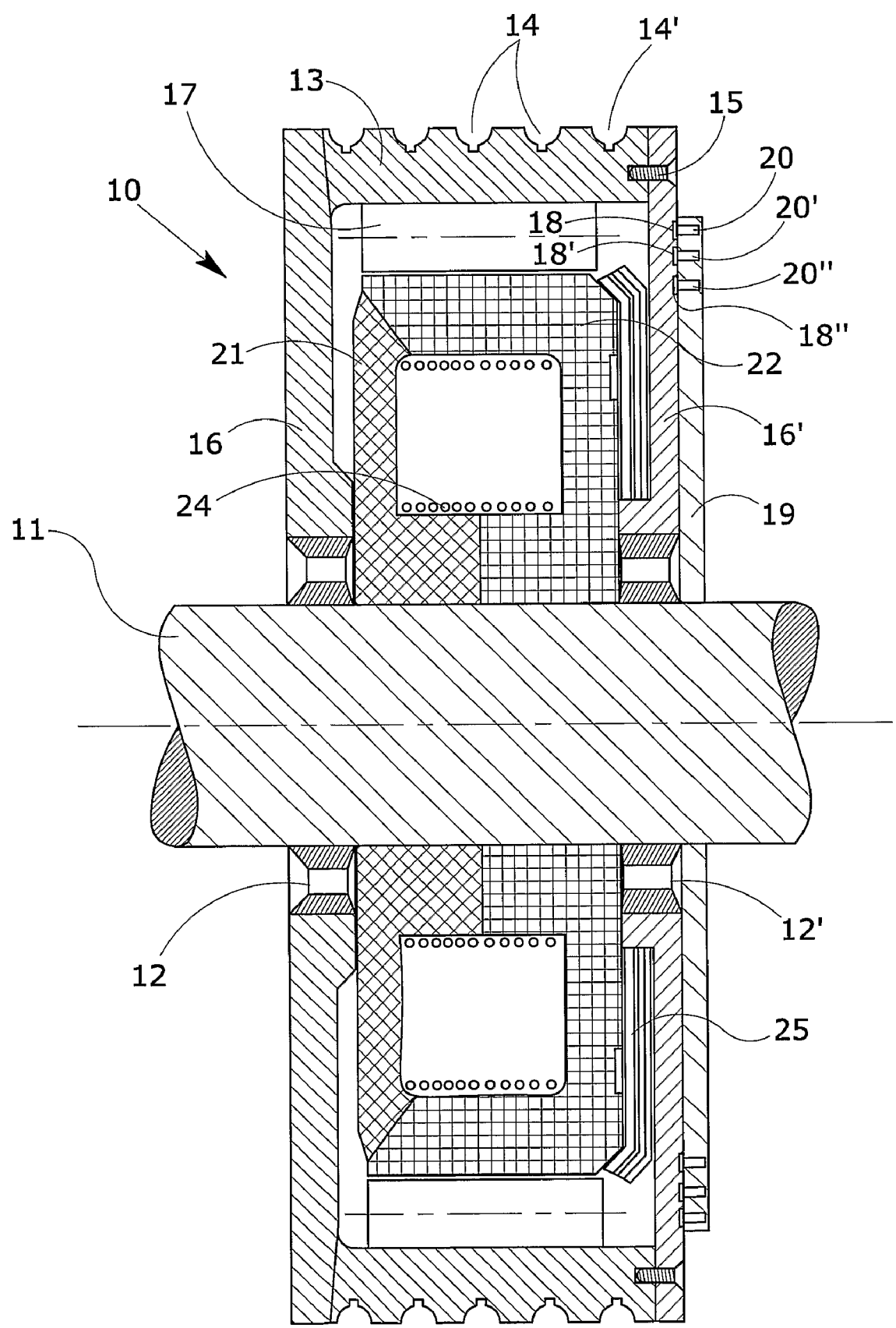

ELECTRIC MOTOR WITH A LOW NUMBER OF REVOLUTIONS, IN PARTICULAR TO DRIVE LIFTING DEVICES

CROSS-REFERENCE TO RELATED APPLICATIONS

This application is an U.S. national phase application under 35 U.S.C. §371 based upon co-pending International Application No. PCT/IB2007/000669 filed on Mar. 19, 2007. Additionally, this U.S. national phase application claims the benefit of priority of co-pending International Application No. PCT/IB2007/000669 filed on Mar. 19, 2007, Italy Application No. BZ2006A000015 filed on Apr. 28, 2006, Italy Application No. BZ2006A000018 filed on May 9, 2006, and Italy Application No. TN2006A000007 filed on May 10, 2006. The entire disclosures of the prior applications are incorporated herein by reference. The international application was published on Nov. 15, 2007 under Publication No. WO 2007/129150.

TECHNICAL FIELD

This invention refers to an electric motor with a low number of revolutions.

In particular, this invention refers to an electric motor with a low number of revolutions which can be advantageously used for applications requiring torque.

By way of example, the electric motor according to the invention can be used to drive lifting devices, such as lifts.

BACKGROUND ART

Electric motors used in applications with a heavy torque requirement, for example electric motors for lifts, are generally positioned inside relatively small spaces, which is a source of problems as the motors are usually fairly large due to the presence, in addition to the motor itself, of a reduction unit and obviously the pulley around which the cables that raise and lower the lift cabin are wound.

The reduction units used in these applications often have electromechnical characteristics that are fairly inconstant over time, leading to functioning irregularities that cause a considerable reduction in the performance of the motor.

DESCRIPTION OF THE INVENTION

This invention proposes to provide a solution to the background art problems, thanks to a new design of motor which is small and is not equipped with a reduction unit.

In particular, in the lifts sector, this invention proposes to provide an electric motor with a low number of revolutions (for example a motor with approximately 50 rpm corresponding to a lifting speed of around 1 m/sec) thanks to which the components necessary for the movement and the braking of the machine can be directly contained inside the drive pulley.

This is achieved by means of an electric motor with the features described in the main claim. The dependent claims describe particularly advantageous embodiments of the electric motor according to the invention.

The most typical configuration of the electric motor according to the invention consists of a rotor (with a high number of magnetic poles) powered by three-phase alternating voltage, and of a stator with the same number of magnetic poles as the rotor, created by a coil powered by direct voltage.

According to a particularly advantageous embodiment of the invention, the direct voltage consists of a single-phase rectified and thus pulsating alternating voltage. This direct voltage makes it possible to obtain excellent results in terms of motor performance.

DESCRIPTION OF THE DRAWINGS

Other features and advantages of the invention will become clear on reading the description of some embodiments of the invention, given as non-binding examples, with the help of the accompanying drawing which shows a cross-section of an electric motor according to the invention.

DESCRIPTION OF SOME EMBODIMENTS OF THE INVENTION

In the FIGURE, the reference number 10 indicates overall an electric motor with a low number of revolutions used to drive lifting devices according to the invention.

The motor 10 is supported by a fixed metal shaft 11 by means of a pair of bearings 12, 12' (either roller or ball bearings) and is enclosed in the casing 13 of a pulley, the outer surface of which is equipped with a series of slots 14, 14' . . . designed to accommodate cables (not shown in the FIGURE) for driving a lifting device, for example a lift. The casing 13 is rigidly fixed by means of screws 15 to a pair of diamagnetic side plates 16, 16' which work in conjunction with the said roller bearings 12, 12'.

The actual electric motor is housed inside the space formed by the diamagnetic plates 16, 16' and the pulley casing 13.

In particular, integral with the inner surface of the pulley 13 is a rotor pack 17 fitted with a series of slots (not shown in the FIGURE) designed to accommodate a three-phase winding powered by alternating voltage. This three-phase winding is connected to three respective conductor rings 18, 18', 18" inserted in appropriate slots cut in the side plate 16'. In addition, a protective guard 19 consisting of two portions joined together and fixed to the shaft 11 supports three respective brushes 20, 20', 20" in contact with the said conductor rings 18, 18', 18".

Respective magnets 21, 22 are positioned next to each other and fixed to the shaft 11. These magnets 21, 22 define a space which houses a stator-powered coil 24 powered by direct voltage in order to create the magnetic polarities of the stator.

Finally, the motor 10 comprises an electromagnetic brake 25 consisting of a pair of metal discs, one of which is integral with the side plate 16' and the other with the magnet 22, and of disc-pushing springs contained in appropriate slots cut in the magnet 22.

Such a motor is particularly suited for application as a machine without a reduction unit in the lifts sector, since the drive pulley can contain all the equipment necessary both to move and to brake the machine.

According to the invention, the respective power supplies of the stator coil 24 (advantageously direct voltage obtained by rectifying single-phase alternating voltage) and of the rotor windings 17 (three-phase alternating voltage) are governed by means of an appropriate control device, until the required number of revolutions is reached, which depends on the number of poles of the motor and on the frequency of the three-phase power supply.

The control device that can be used for these applications is the variable frequency type, for example the ac-dc-ac or dc-ac type.

According to the invention, the stator coil 24 is powered by direct voltage. In this embodiment, the motor comprises a high number of magnetic poles, both stator and rotor having the same number, and in the stator the poles are the clawed type as in automobile alternators. Some features of the synchronous motor in terms of performance are lost in this case, achieving however an acceleration torque that makes it possible to obtain the required number of revolutions from the rotor by merely varying the frequency of the three-phase power supply of the rotor itself.

In order to avoid flow leakage between the driving shaft and the coil, the side plates 16, 16' are made from diamagnetic material.

As far as the steady state speed and the braking and acceleration phases are concerned, the stator 24 is constantly powered by direct voltage, while the rotor 17 has a variable frequency achieved by means of a frequency converter external to the rotor. In this case, during the acceleration and deceleration phases the frequency of the three-phase voltage of the rotor 17 is adjusted by frequency converters (ac-dc-ac or dc-ac) which provide the frequencies, currents and thus the torques required.

The invention is described above with reference to a preferred embodiment, in which the main shaft is fixed, the stator is integral with the shaft and the rotor turns around the shaft and the stator.

Embodiments of this invention are nevertheless foreseen in which the conformation of the motor is inverted, and the main shaft rotates, while the motor casing integral with the three-phase windings is fixed.

In this case, the main shaft is equipped with a pair of conductor rings connected to appropriate cables inserted in slots in the shaft and connected to windings of the coil and of the rotating magnets.

A pair of brushes is then connected to the rings for transmission of the current, while the mechanical drive organs, in particular the lifting organs, are connected to the main shaft.

The invention claimed is:

1. An electric motor with a low number of revolutions for providing torque, said electric motor comprising:
    a rotor powered by three-phase alternating voltage;
    a series of magnets made from ferrous material; and
    a coil forming a stator, in which said rotor and said stator have the same number of magnetic poles;
    said coil of said stator being powered by direct voltage, and the frequency of the rotor voltage being variable so as to vary the acceleration and deceleration conditions of said motor and to obtain a predetermined number of rpm of said motor in order to achieve a constant speed;
    said rotor, said stator and said magnets being enclosed in a pulley casing which rotates around a fixed shaft, said rotor being fixed to said pulley casing;
    said electric motor further comprising a fixed protective guard fitted with a series of brushes connected to respective rings rotating with said pulley casing, and electrically connected to a three-phase rotor windings of said rotor;
    said pulley casing presenting a series of peripheral slots designed to accommodate drive cables and being flanked by a pair of plates made from diamagnetic material; and
    wherein said electric motor further comprises an electromagnetic brake consisting of a pair of metal discs and discs-pushing springs, one of said discs being integral with one of said diamagnetic plates and the other of said discs being integral with the magnet which produce the poles of the stator, and said disc-pushing springs being located in appropriate slots cut in said magnet integral with said disc, the two ferromagnetic discs have respectively: one disc has a circular slots having a trapezoidal section, the other disc has one circular protuberance having a section partially formed by circle arches.

2. The electric motor according to claim 1 further comprising a mechanical brake unit.

3. The electric motor according to claim 1, wherein said magnets forming said stator are fixed to said shaft.

4. The electric motor according to claim 1, wherein the said stator is formed by a unique coil which is powered by a constant current which creates a series of clawed poles; south poles which alternate themselves to a north poles, which total number of the poles of three phase rotor voltage.

5. The electric motor according to claim 1, wherein said rotor has a variable frequency achieved by a frequency converter external to said rotor.

6. The electric motor according to claim 4, wherein the frequency of three phase voltage of said rotor during its acceleration and deceleration phased is adjusted by frequencies, currents and thus the torques required.

7. An alternative solution for an electric motor comprising:
    a stator external to a rotor, said rotor having a three-phase windings and powered by a three-phase alternating voltage;
    a series of magnets made from ferrous material;
    a rotor internal to the said stator wherein said rotor has the same number of magnetic poles of the said stator, wherein the said magnetic poles of the said rotor are venerated by one unique coil powered by constant continue current through two rings rotating with the rotor and electrically connected with two brushes fixed to the stator which supply the two said rings; and
    an external casing enclosing said stator, said rotor and said magnets, said stator being fixed to said external casing and said rotor being fixed to a rotating shaft partially enclosed in the external casing;
    wherein the acceleration and the deceleration conditions of the said rotor are obtained by varying the frequency of the power supply of the three-phase alternating voltage stator windings, wherein said electric motor comprises an electromagnetic brake consisting of a pair of metal discs and disc-pushing springs, one of said discs being integral with one of said plates and the other said discs being integral with the said magnet, and said disc-pushing springs being located in appropriate slots cut in said magnet integral with said disc.

8. The electric motor according to claim 7, wherein said stator is powered by three-phase alternating voltage obtained by a frequency converter AC-DC-AC, and wherein said rotor is now consisting in one coil which produce a number of magnetic poles equal to the magnetic poles of the three-phase stator voltage, and wherein said rotor is powered by a constant current through two fixed brushes and two rings which rotates together with the rotor.

9. The electric motor according to claim 8, wherein said stator will have fixing feet typical for electric motor or generator, and wherein the said rotor could drive gears or friction wheels which could be applied to lifting systems or to horizontal motion transmission systems.

10. The electric motor according to claim 9, wherein said external casing is flanked by a pair of plates made from diamagnetic material.

11. The electric motor according to claim 7, wherein the acceleration and the deceleration of the said rotor will be always produced by varying the frequency of three-phase alternating voltage and whereas the rotor will be always powered by a constant and continue voltage.

\* \* \* \* \*